Sept. 9, 1969   E. PERNET   3,466,409
CIRCUIT BREAKER FOR VEHICLE IGNITION SYSTEM
Filed Feb. 20, 1967   2 Sheets-Sheet 2

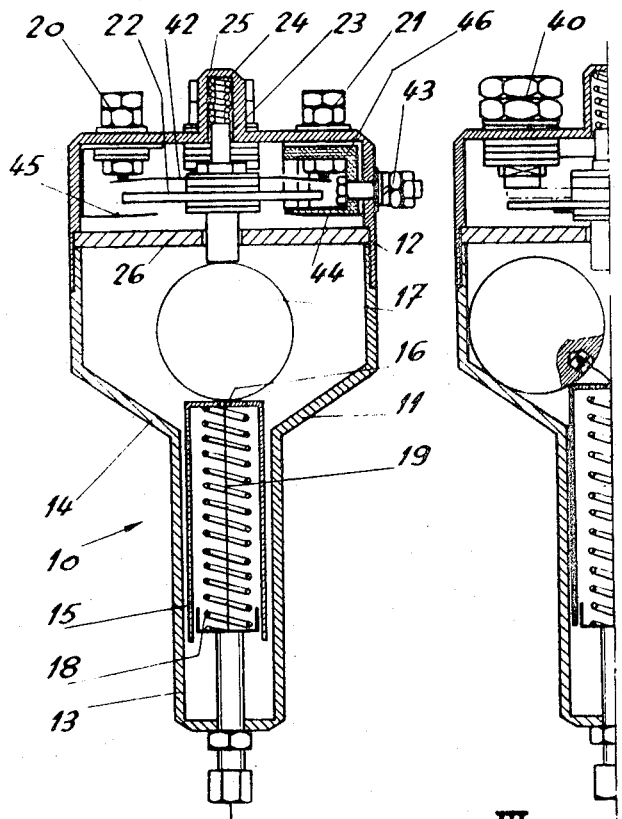

INVENTOR
Emile PERNET

ATTORNEY

United States Patent Office 3,466,409
Patented Sept. 9, 1969

3,466,409
CIRCUIT BREAKER FOR VEHICLE IGNITION SYSTEM
Emile Pernet, 17 Blvd. de la Cluse, Geneva, Switzerland
Filed Feb. 20, 1967, Ser. No. 617,308
Claims priority, application Switzerland, Oct. 22, 1966, 15,419/66
Int. Cl. H01h 35/02
U.S. Cl. 200—61.45
5 Claims

ABSTRACT OF THE DISCLOSURE

A safety device intended to cut off the power source in a motor vehicle during a collision comprising a circuit breaker having a movable member maintained in closure position by a body which, through inertia at the time of the collision moves and causes opening of the breaker and a remote control device to replace the said body in its normal position when it has moved away therefrom, the body being a ball normally resting on a seat that can be retracted at a distance through the action of a control mechanism acting against the bias of a spring.

---

The present invention relates to a safety device intended to automatically cut off the power source of the electrical circuit of a motor vehicle during a collision. This apparatus comprises, on the one hand, a breaker having a movable member retained in closed position by a body which, through inertia at the time of the collision, moves and causes opening of the breaker and, on the other hand, a remote control device allowing the driver of the vehicle, from his seat, to bring the body back into its normal position when it has moved away.

This apparatus is characterized by the fact that said body is a ball normally resting on a seat that can be retracted through a remote control device against the bias of a spring.

The appended drawing illustrates, by way of example, two embodiments of the invention intended for a motor vehicle.

FIGURE 1 is a plan view of the invention according to a first embodiment;

FIGURE 2 is a cross-sectional view taken along line II—II of FIGURE 1, the apparatus being shown in operation;

FIGURES 3 and 4 are half cross sectional views along lines III–IV of FIGURE 1 respectively illustrating the apparatus after it has been triggered and after it has been reset;

Figure 6:
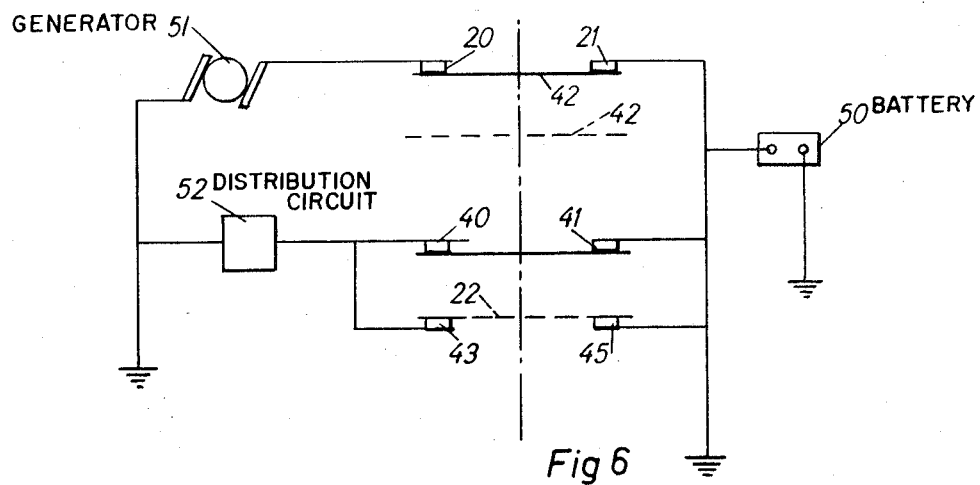
FIGURE 6 is a circuit diagram illustrating the electrical connection of the apparatus illustrated in FIGS. 1–4.
Figure 5:
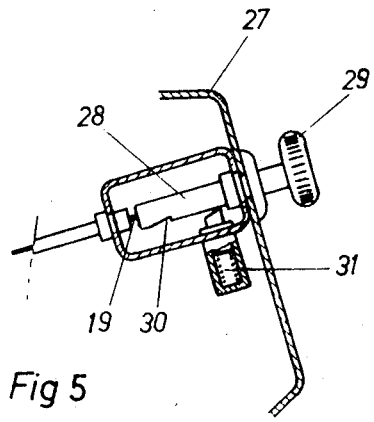
FIGURE 5 is a cross-sectional view of the control mechanism.

The apparatus shown in FIGURES 1 to 5 comprises a casing 10 formed of a body 11 and a cover 12 screwed thereto. Body 11 has a cylindrical base 13 and an upper flaring part 14. A piston 15 is mounted for sliding displacement in the cylindrical base 13, piston 15 having a centrally apertured upper face constituting a seat 16 for a steel ball 17. The said piston 15 may be displaced downwardly against the bias of a spring 18.

Ball 17 is secured at the end of a cable 19 (FIGURE 3) extending through piston 15 and the other end of which is connected to an operating member of the apparatus on the dashboard of the vehicle, more specifically a pull lever to be referred to again hereinafter.

Within cover 12 are insulatingly mounted the two terminals 20–21, 40–41 of two breakers provided with movable members. One movable member is a copper disc 22 and the second is constituted by two metal tongues 42 electrically insulated from the disc 22. These two breakers are intended to be respectively inserted in the battery circuit and in the generator circuit.

A fifth terminal is mounted on the side of the cover. It is solid with a metal strip 44 intended to be grounded, through disc 22, and a metal strip 45 in contact with cover 12. In principle, terminal 43 will be connected to the rotatable arm of the plug feeding device.

Disc 22 and tongues 42 are mounted on an axle 23 slidable against a spring 24 weaker than spring 18. This axle is displaceable, on the one hand, in a housing 25 of the cover and, on the other hand, across a circular opening provided through a plate 26 secured between the cover 12 and the body of the casing 10. A double stop 46 made of insulating material and mounted on the terminal 43 inwardly of the cover 12 prevents any rotation of the axle 23 on its own axis.

The lower end of axle 23 normally bears against the ball 17 through the bias of spring 24 which is compressed in the axial position for which the terminals 20–21 and 40–41 are respectively engaged by the movable members 42 and 22.

The device further comprises a control device (FIGURE 5) located on the dashboard 27 of the vehicle. This device comprises a pulling rod 28 having an operating knob 29 and a notch 30 intended to cooperate with a lock 31.

The pulling rod 28 is connected to the second end of cable 19. By pulling on the knob 29 toward him, the driver causes piston 15 to move down against the bias of spring 18 which compresses. When the pulling rod has reached its locking position, the seat 16 is retracted and the ball 17 rests on the neck of the flaring part 14 of the casing. The driver may, at this moment, unlock the control device by freeing the lock through rotation of the pulling rod and release the latter allowing the piston and the ball to move back to their working positions.

The operation of the apparatus is based on the displacement of the ball 17 during a collision. This displacement which is caused by the inertia in the ball brings the latter in the position it occupies in FIGURE 3. During this movement, the axle 23 being no longer held moves downwardly under the action of spring 24 which decompresses until disc 22 comes to abut against the metal strips 44 and 45. At that moment, the two breakers are open, that is the battery and the generator are cut off and no spark can take place between the electrodes of the plugs. Any danger of an explosion or fire is thus avoided.

The action of spring 18 may be adjusted in such a manner that the apparatus operates only as a result of a collision and not because of sudden braking.

The control device may be used by the driver either to replace the ball in position and thus close the breaker if the collision has had no serious consequences and he desires to put the car in driving condition again, either to voluntarily cut off the battery by placing the pulling rod in locking position, as an anti-theft measure or to cut off any eventual current leaks which could cause complete discharge of the battery during prolonged inoperation of the vehicle.

FIGURE 4 illustrates the device when the driver has, through operation of the pulling rod, caused ball 17 and piston 15 to move down either to reset the device or as an anti-theft measure.

The circuit of FIGURE 6 illustrates the electrical connection of the apparatus illustrated in FIGURES 1 to 4. As mentioned briefly in the description of FIGURES 1 to 4, battery 50 in the normal position of the apparatus, is connected to the generator 51 and to the distribution circuit 52. After a collision, metal tongues 42 are disconnected while copper disc 22 moves into electrical contact with contacts 43, 45 to close a circuit to ground terminal 43 which, as mentioned previously, is connected to the rotatable arm of the plug feeding device.

I claim:

1. In a safety device intended to automatically cut off the power source from the electrical circuit of a motor vehicle during a collision, the improvement comprising:
   (a) a circuit breaker located in said electrical circuit;
   (b) said circuit breaker including a pair of terminals and an electrically conductive movable member adapted to engage said terminals to thereby close said circuit breaker and energize said electrical circuit;
   (c) means for biassing said movable member to disengage said terminals and to thereby open said circuit breaker;
   (d) a ball in contact with, but electrically insulated from, said movable member;
   (e) a retractable seat for said ball;
   (f) resilient means driving said seat against said ball which in turn moves said movable member to close said circuit breaker when said ball, seat, and movable member are axially aligned, said ball being displaceable through inertia at the time of the collision to free said movable member which, under the action of said biassing means, opens said circuit breaker; and
   (g) a remote control mechanism operatively connected to said ball for retracting said ball and said seat against the action of said resilient means to replace said ball in position on said seat after said ball has been displaced from said axially aligned position.

2. The improvement of claim 1, said remote control mechanism including locking means to retain said retractable seat in retracted position to keep said breaker in open position.

3. The improvement of claim 1, wherein said remote control mechanism comprises:
   an operating lever mounted on the dashboard of said vehicle;
   a cable fixed at one end to said operating lever and at the other end to said ball through said seat arranged so that said ball having moved away from its seat, it can be brought back by operation of the operating lever.

4. The improvement of claim 1, including an upwardly and outwardly flaring housing; said retractable seat being at the bottom of said housing and being retractable to below said housing to allow said ball to return on the retractable seat after it has moved away following a collision.

5. The improvement of claim 1, wherein said circuit breaker includes an additional member secured to, movable with, and electrically insulated from said movable member; terminal means on said housing, said terminal means, in part, being electrically connected to a grounded element of said motor vehicle and with the ignition circuit elements thereof; said additional member contacting said terminal means connected to said grounded element and to said ignition circuit elements to ground said ignition circuit when said ball is moved out of contact with said movable member and said movable member simultaneously opens said circuit breaker.

References Cited
UNITED STATES PATENTS

| | | | |
|---|---|---|---|
| 2,056,494 | 10/1936 | Tucker et al. | 200—61.45 |
| 2,223,097 | 11/1940 | Ehret | 180—96 X |
| 2,912,534 | 11/1959 | Rowell et al. | 200—61.45 X |
| 3,198,899 | 8/1965 | Hitchcock | 180—104 X |

A. HARRY LEVY, Primary Examiner

U.S. Cl. X.R.

180—96